United States Patent
Tourneur et al.

(10) Patent No.: US 7,068,160 B2
(45) Date of Patent: Jun. 27, 2006

(54) OPEN AUTOMOTIVE DOOR ALERT

(75) Inventors: Kevin M Tourneur, West Bloomfield, MI (US); Gayle Morris, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 108 days.

(21) Appl. No.: 10/827,391

(22) Filed: Apr. 19, 2004

(65) Prior Publication Data

US 2005/0231337 A1  Oct. 20, 2005

(51) Int. Cl.
*B60Q 1/52* (2006.01)

(52) U.S. Cl. ............ 340/471; 340/468; 340/470; 340/472; 340/478

(58) Field of Classification Search ........ None
See application file for complete search history.

(56) References Cited

U.S. PATENT DOCUMENTS

| | | | | |
|---|---|---|---|---|
| 2,844,810 A | | 7/1958 | Steele | |
| 2,901,593 A | | 8/1959 | McNally | |
| 2,918,565 A | * | 12/1959 | Vermette | 362/501 |
| 3,372,373 A | * | 3/1968 | Heidman, Jr. | 340/425.5 |
| 3,372,374 A | * | 3/1968 | Heidman, Jr. | 340/425.5 |
| 3,873,968 A | * | 3/1975 | Baader | 340/433 |
| 4,807,101 A | * | 2/1989 | Milde, Jr. | 362/276 |
| 4,833,448 A | * | 5/1989 | Chang | 340/425.5 |
| 4,965,546 A | * | 10/1990 | Chang | 340/468 |
| 4,972,173 A | * | 11/1990 | Raciti | 340/472 |
| 5,193,895 A | | 3/1993 | Naruke et al. | |
| 5,523,926 A | | 6/1996 | Gold | |
| 5,711,593 A | | 1/1998 | Gold | |
| 5,828,299 A | * | 10/1998 | Chen | 340/468 |
| 5,842,770 A | | 12/1998 | Gold | |
| 5,969,603 A | * | 10/1999 | Wang | 340/471 |
| 6,064,300 A | * | 5/2000 | Jones | 340/433 |
| 6,184,786 B1 | * | 2/2001 | Medeiros | 340/463 |
| 6,252,500 B1 | * | 6/2001 | Chueh et al. | 340/472 |
| 6,710,710 B1 | * | 3/2004 | Wang | 340/468 |

* cited by examiner

*Primary Examiner*—Daniel Wu
*Assistant Examiner*—Son Tang
(74) *Attorney, Agent, or Firm*—Ralph E. Smith

(57) ABSTRACT

An open door alert system for a vehicle causes an exterior light of the vehicle to flash if one or more vehicle doors are open. A sensor determines if the door, such as a sliding door of a van or minivan, is open. If the door is open, the exterior light flashes on and off to alert drivers of other vehicles that passengers may be entering or exiting the vehicle. Additionally, an interior vehicle light flashes concurrently with the exterior light to alert the driver that the door is open.

12 Claims, 2 Drawing Sheets

OPEN AUTOMOTIVE DOOR ALERT

FIELD OF THE INVENTION

The present invention relates to warning lights for vehicles, and more particularly to activating the warning lights if a door is opened.

BACKGROUND OF THE INVENTION

Passenger vehicles such as minivans often park or stop to allow passengers to enter or exit the vehicle. If the vehicle transmission is in park, the driver may not have the brake pedal pressed. Therefore, the brake lights are not activated, and drivers of other vehicles may not be alerted that passengers may be entering or exiting the vehicle. Furthermore, if the vehicle is equipped with sliding passenger doors, drivers of other vehicles may not see that a door is open.

SUMMARY OF THE INVENTION

Accordingly, an open door alert system is provided for a vehicle comprising a sensor that determines if a door is open. At least one vehicle exterior light is operable to flash when activated. A controller communicates with the sensor and the vehicle exterior lights and activates the exterior vehicle lights if the door is open.

In a further aspect of the invention, a method for indicating an open door in a vehicle comprises determining if a door is open. One or more vehicle lights are activated to flash if the door is open.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
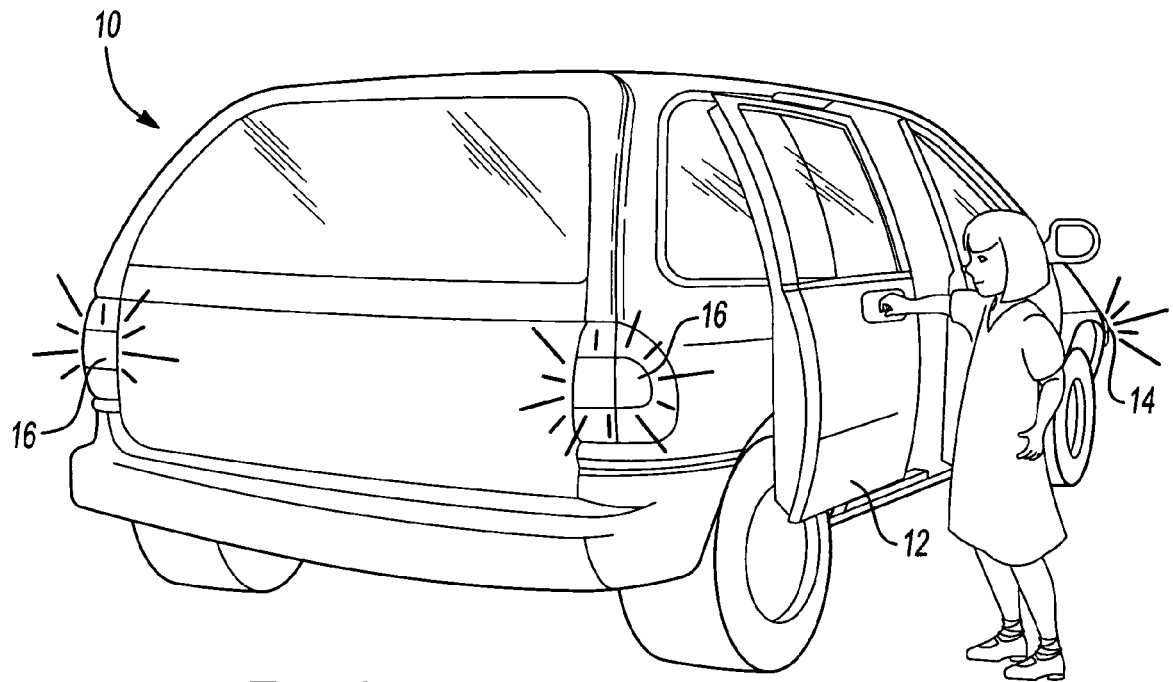
FIG. 1 illustrates an open automotive door alert according to the present invention.

A vehicle 10 such as a minivan or other vehicle includes one or more access doors 12 as shown in FIG. 1. In the preferred embodiment, the door 12 is a sliding door as is customary on a van or minivan. It is to be understood, however, that the present invention is not limited to sliding doors. The vehicle 10 includes one or more sets of lights 14 and 16. For example, the lights 14 are located at an anterior portion of the vehicle 10 and may be headlights or turn signal indicator lights. In the preferred embodiment, the lights 14 are the front turn signal indicator lights. The lights 16 are located at a posterior portion of the vehicle 10 and may be taillights, brake lights, or turn signal indicators. In the preferred embodiment, the lights 16 are the rear turn signal indicator lights. When the door 12 is open or ajar, the lights 14 and 16 flash. For example, the lights 14 and 16 may operate similar to vehicle warning lights as are known in the art. In this manner, the lights 14 and 16 flash to alert drivers of other vehicles that passengers may be entering or exiting the vehicle 10.

Figure 2:
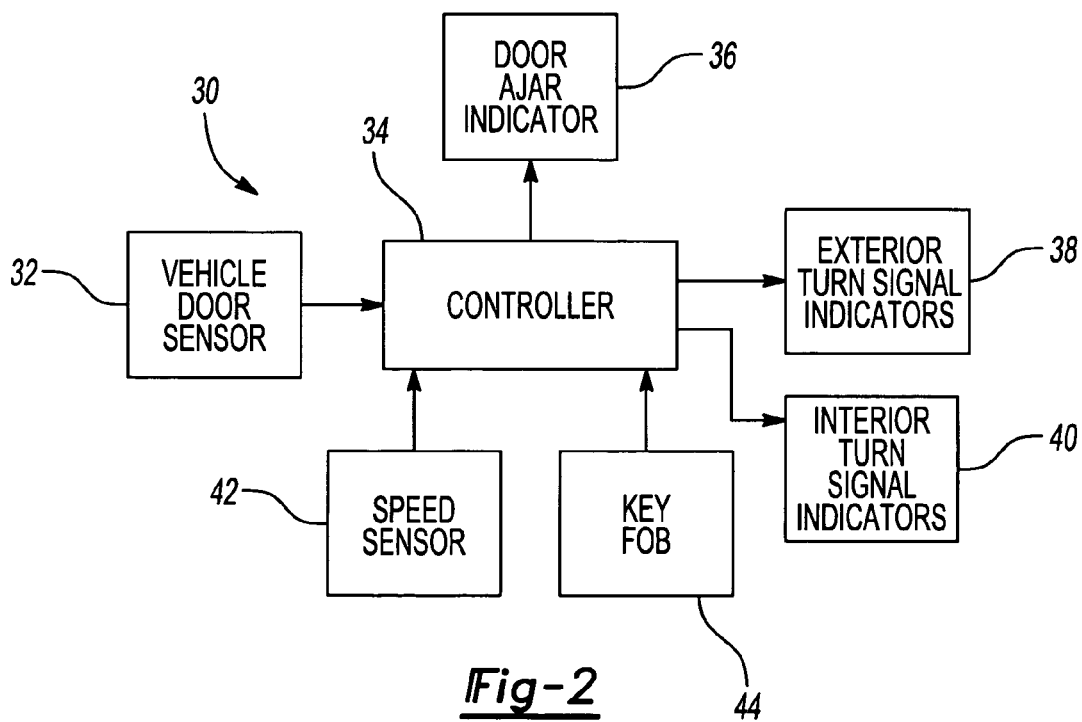
FIG. 2 is a functional block diagram of an open automotive door alert system according to the present invention.

An exemplary open automotive door alert system 30 according to the present invention includes a vehicle door sensor 32, a controller 34, an interior door ajar indicator 36, exterior turn signal indicators 38, and interior turn signal indicators 40 as shown in FIG. 2. The open automotive door alert system 30 may also include a speed sensor 42 and a key fob 44. The vehicle door sensor 32 senses if the vehicle door is open or closed. The controller 34 communicates with the vehicle door sensor 32 to determine if the vehicle door is open. If the vehicle door is open, the controller 34 activates the exterior turn signal indicators 38 and/or the interior turn signal indicators 40. In the preferred embodiment, the interior turn signal indicators 40 flash concurrently with the exterior turn signal indicators 38. In this manner, the driver is alerted that the exterior turn signal indicators 38 are operating as warning lights. The controller 34 may also activate the door ajar indicator 36. Additionally, the controller 34 communicates with the key fob 44. The controller 34 is operable to activate the exterior turn signal indicators 38 in response to the door being opened manually, with an interior power door button, or with the key fob 44.

The controller 34 may activate the exterior turn signal indicators 38 for a fixed duration when the door is opened. Conversely, the exterior turn signal indicators 38 may flash until the door is closed. A driver or other user may disable the open automotive door alert system 30 via an internal switch or the key fob 44.

The open automotive door alert system 30 may also be responsive to the speed sensor 42 and/or other vehicle components. For example, in the preferred embodiment the open automotive door alert system 30 is not operable if the speed of the vehicle is greater than a threshold such as 1 mph. Therefore, the controller 34 will not activate the exterior turn signal indicators 38 if the vehicle is in motion and the door is merely ajar. Additionally, the open automotive door alert system 30 is operable with the vehicle ignition on or off. The open automotive door alert system 30 may be operable with the vehicle in any gear, or only when the vehicle is in park or neutral. In another embodiment of the invention, the open automotive door alert system 30 is disabled if the vehicle brake is pressed.

Figure 3:
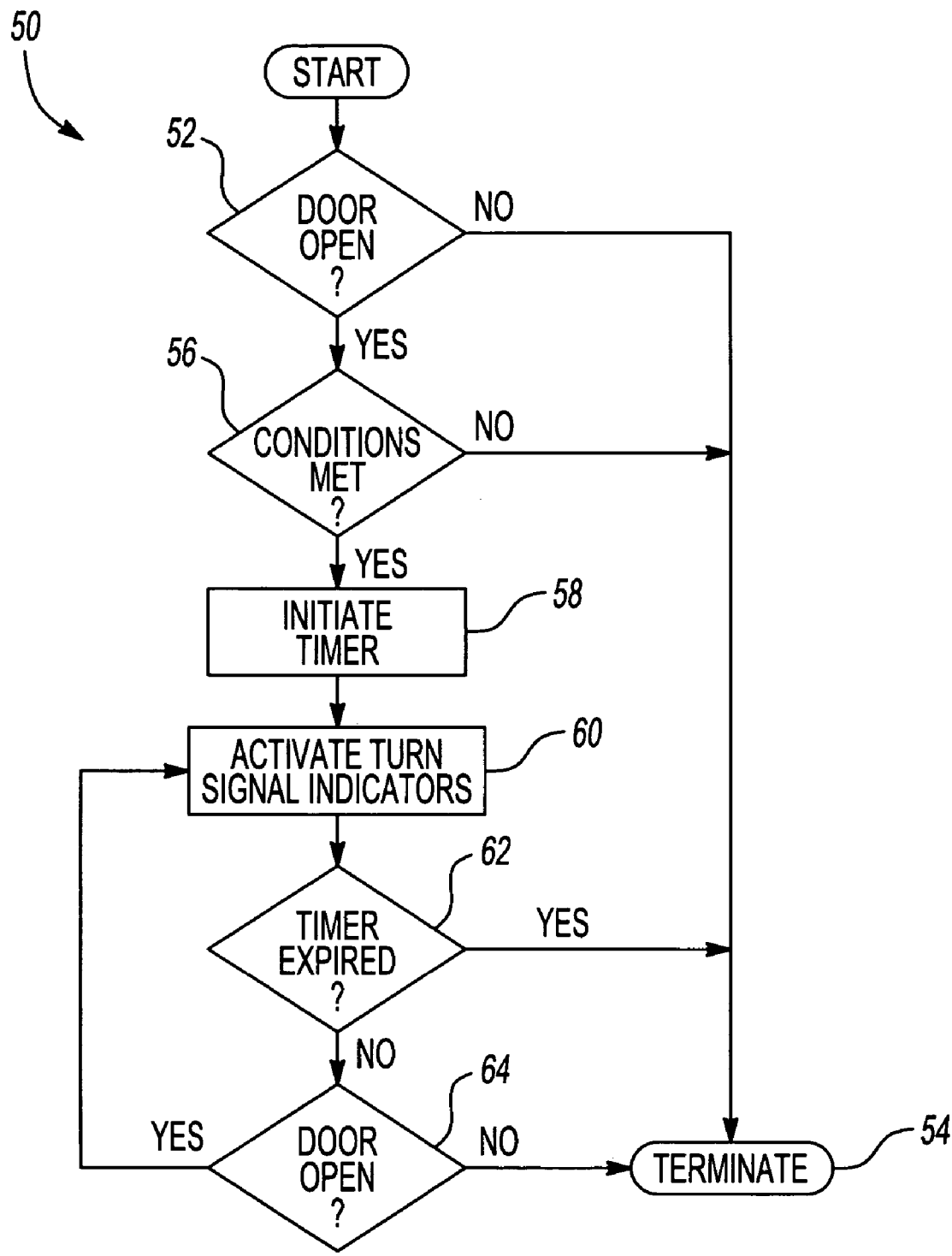
FIG. 3 is a flow diagram of an open automotive door alert method according to the present invention.

Referring now to FIG. 3, an open automotive door alert system method 50 is shown. At step 52, the method 50 determines if a vehicle door is open. If the door is not open, the method 50 terminates at step 54. If the door is open, the method 50 determines if one or more vehicle conditions are met at step 56 as described above. For example, various vehicle conditions may include, but are not limited to, vehicle speed, a disable condition, and a vehicle gear. If one or more of the conditions are not met, the method 50 terminates at step 54. If the conditions are met, the method 50 continues to step 58. At step 58, the method 50 initiates a timer. The method 50 activates the exterior turn signal indicators at step 60. The method 50 determines if the timer has reached a predetermined duration at step 62. If the timer has reached the predetermined duration, the method terminates at step 54. If the timer has not reached the predetermined duration, the method 50 determines if the door is still open at step 64. If the door is no longer open, the method 50 terminates at step 54. If the door is still open, the method 50 continues to activate the exterior turn signal indicators at step 60. Additionally, the method 50 may determine if other disable conditions are met at step 62, such as a driver-initiated disable.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An open door alert system for a vehicle comprising:
   a door position sensor that determines if a door is open;
   a speed sensor that determines vehicle speed;
   a transmission gear sensor that determines a state of a transmission of the vehicle;
   a brake position sensor that determines whether a vehicle brake is engaged;
   a turn signal switch; and
   a controller responsive to the sensors to activate a vehicle exterior mounted light to flash when the door is open whenever vehicle speed is below a preselected threshold, the vehicle transmission is in park or neutral gear, the vehicle brake is not activated, and the turn signal switch is not activated.

2. The open door alert system of claim 1 wherein the door is a sliding door.

3. The open door alert system of claim 1 wherein the exterior light is operable to function as a warning light.

4. The open door alert system of claim 1 wherein the exterior light comprises an exterior turn signal indicator.

5. The open door alert system of claim 1 further comprising an interior vehicle light activated to flash by the controller when the door is open.

6. The open door alert system of claim 1 wherein the controller activates the exterior light for a predetermined time period.

7. The open door alert system of claim 1 wherein the controller deactivates the exterior light if the door is closed.

8. A method for indicating an open door in a vehicle comprising:
   determining if a door is open;
   determining vehicle speed;
   determining a vehicle transmission gear;
   determining whether a vehicle brake is actuated;
   determining whether a turn signal switch is actuated; and
   flashing a vehicle exterior light if the door is open, the vehicle speed is less than a preselected threshold, the vehicle transmission is in park or neutral, the vehicle brake is not actuated, and the vehicle turn signal switch is not activated.

9. The method of claim 8 wherein the flashing causes the vehicle exterior light to function as a warning light.

10. The method of claim 8 wherein the flashing occurs for a predetermined time period.

11. The method of claim 8 further comprising terminating the flashing after a predetermined time period.

12. The method of claim 8 further comprising terminating the flashing if the door is closed.

* * * * *